(12) United States Patent (10) Patent No.: US 6,512,733 B1
Kawano et al. (45) Date of Patent: Jan. 28, 2003

(54) OPTICAL RECORDING METHOD, OPTICAL RECORDING APPARATUS, OPTICAL READING METHOD, AND OPTICAL READING APPARATUS

(75) Inventors: Katsunori Kawano, Nakai-machi (JP); Tsutomu Ishii, Nakai-machi (JP); Kazuo Baba, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/385,034

(22) Filed: Aug. 30, 1999

(30) Foreign Application Priority Data

Sep. 3, 1998 (JP) .......................................... 10-265727

(51) Int. Cl.$^7$ ................................................ G11B 7/00
(52) U.S. Cl. ............................ 369/110.01; 369/110.04; 369/112.16
(58) Field of Search .......................... 369/47.1, 47.11, 369/47.16, 47.47, 53.1, 59.1, 110.01, 110.02, 110.04, 275.1, 112.16

(56) References Cited

U.S. PATENT DOCUMENTS 4,774,615 A * 9/1988 Revelli et al. ......... 369/110.02

FOREIGN PATENT DOCUMENTS

JP A-64-17248 1/1989
JP A-4-38720 2/1992

\* cited by examiner

*Primary Examiner*—Muhammad Edun
(74) *Attorney, Agent, or Firm*—Oliff & Berridge, PLC

(57) ABSTRACT

The present invention provides an optical recording method, optical recording apparatus, optical reading method, and optical reading apparatus which are capable of high density recording an d high speed recording, and high speed reading. In recording, a recording light comprising a plurality of polarization distributions corresponding to the data information; is generated, and irradiated onto an optical recording medium to thereby record a plurality of polarization distributions of the recording light on the optical recording medium as photo-induced birefringence. In reading, a reading light having a uniform polarization distribution is irradiated onto the recording medium in which the data information has been recorded previously, and the polarization distribution of the transmitted light or reflected light in the optical recording medium is read as the polarization distribution of the reproducing light.

37 Claims, 10 Drawing Sheets

OPTICAL RECORDING METHOD, OPTICAL RECORDING APPARATUS, OPTICAL READING METHOD, AND OPTICAL READING APPARATUS

BACKGROUND OF THE INVENTION

1. Field of the Invention

This invention relates to an optical recording method and apparatus for recording data information in an optical recording medium, and an optical reading and apparatus for reading data,information from an optical recording medium.

2. Description of Related Art

Phase change type and magneto-optical type rewritable optical disc apparatus have been widely used. The recording density of these optical disc apparatus is one order or more higher than that of general magnetic disc apparatus, however insufficient::for digital recording of the video image. To increase the recording density, it is necessary that a beam spot diameter should be reduced so that the distance between adjacent tracks or adjacent pits is reduced. One of such technologies which has been already commercialized is DVD-ROM. A DVD-ROM stores 4.7 GBytes data on one side having a diameter of 12 cm. The recording density of a phase change type writable and erasable DVD-RAM is as high as 5.2 GBytes on both side of a disc having a diameter of 12 cm. This data quantity which is equivalent to four or more CD-ROM's, and to 1900 floppy discs can be written/read.

As described hereinabove, the recording density of the optical disc has been increased year by year. However, on the other hand, because data are recorded on in the plane of the above-mentioned optical disc, the attainable recording density is limited by the optical diffraction ultimate and the actual recording density approaches the physical limit (5 GBytes/in$^2$) To increase the recording density more, it is necessary that three dimensional (volume type) recording including in depth direction or multi-level recording in a single recording pit is applied.

Photo-refractive material has been known as the above-mentioned volume type optical recording medium. Because this material causes change in refractive index when the material absorbs a relatively weak light, and it is possible to use for information recording in the form of photo-induced refractive index change. Therefore, the material can be used for volume multiple holographic recording, which has a large capacity. For example, LiNbO$_3$ is used as the recording medium of a digital holographic memory described in "Volume Holographic Storage and Retrieval of Digital Data" SCIENCE JOURNAL, Vol. 265, pp. 749–752 (1994). This optical system is structured as described hereunder. First, a light emitted from a light source is divided into two light waves by a beam splitter. A light which passes thorough the beam splitter is converted to a collimated light having a wide aperture by a lens and entered to a spatial light modulator. The spatial light modulator which is controlled by a computer generates signal lights having two dimensional intensity distribution. The signal light is focused onto a recording medium (LiNbO$_3$) by a lens. On the other hand, a light reflected by the beam splitter is reflected by a mirror and& entered to the above-mentioned recording medium. This light is used as a reference light. The signal light and reference lights are incident simultaneously upon the recording medium to record data holographically. To read out the hologram, only the reference light is incident upon a recording medium, the reference light is diffracted onto the optical path of the signal light as if the signal light would pass through the recording medium, and the light is imaged on a camera by a lens.

This system uses a differential code method. In this method, a pair of pixels are used, for example, 0 is represented by "dark bright" and 1 is represented by "bright dark". Because the number of bright and dark is the same always, and the light intensity of object light which has been generated by the spatial light modulator is constant. Therefore, it is not necessary to adjust the reference light intensity every page. In reproduction of a hologram, the light intensity is apt to fluctuate and it is difficult to define the white black level uniformly, however in the differential code method, only the edge may be read and therefore noise hardly affects the reproduced signals.

On the other hand, in the field of the in-plane recording method, a technology for recording multi-level data in a single recording pit has been proposed. The principle of opto-magnetic recording is based on reading of polarization angle change of a reflected light due to electro-optical Kerr effect which occurs in the recording area. In spite of various devices, the polarization angle change obtained by Kerr effect remains in a small change as small as 1 degree. Therefore it is difficult to convert the data into multi-level within small change, and the device to widen the dynamic range of a signal has been tried. For example, Japanese Published Unexamined Patent Application No. Sho 64-17248 discloses a recording medium having a multiple recording films different in Curie temperature as a means to realize the multi-level recording. Furthermore, Japanese Published Unexamined Patent Application No. Hei 4-38720 discloses a method for obtaining multiple value by changing the inclination of an ellipse recording pit which is used as a recording pit as a means to record/reproduce multi-level in an optical disc.

However, the above-mentioned digital holographic memory is disadvantageous in the problem described hereunder. Usually a signal light having data information and reference light which interferes with the signal light are necessary. It is required that the signal light and reference light should be generated by separating the same light source and the optical path difference between these two light waves is within the coherent length of the laser. A laser diode could be the light source as one method, but because the coherent length of a laser diode is very short, high accuracy is required for the alignment of the optical system. Furthermore, because the signal light and reference light pass independent optical paths and are affected by outside light and noise of the optical system respectively, and these factors causes deterioration of a reproduced image. Furthermore, because independent optical paths are necessary respectively for the signal light and reference light, the system cannot be made compact disadvantageously.

The digital holographic memory is expected to be large capacity duel to volume multiple recording, however there is an inevitable problem associated with the principle of the hologram multiple recording. The problem is that the diffraction :efficiency of the individual reproduced image decreases in proportion to the square of the degree of multiplex. Therefore, if the efficiency of 100% is obtained theoretically, the 10 multiple recording results in the efficiency of 1%. Furthermore, because scattering noise is independent of the degree of multiplex, S/N decreases significantly. If the digital holographic memory is used as a file memory for a computer, the digital holographic memory cannot satisfies the required bit error rate due to reduced S/N, therefore cannot be used for high density recording currently. Therefore, it is expected to develop a memory with high S/N used while high speed transfer due to parallel recording/reading of the holographic memory is maintained.

On the other hand, the in-plane recording method in which multi-level data is recorded in a single recording pit is also disadvantageous in that the transfer speed is slower than that of holographic memory, in which a plurality of pits arranged two-dimensionally are read out at a time, because data is read from pits one by one. Furthermore, in the case of a method in which a recording medium formed of multi-layered recording films of different Curie temperature as described hereinabove, the number of layers is limited due to difficulty in fabrication process, and the dynamic range cannot be widened and the number of multiple values is limited. Furthermore, the increased film thickness of recording area due to increased number of layers results in reduced recording density in the plane direction due to heat diffusion in the direction of disc plane.

To secure the same recording density as that of the conventional method for multi-level recording by use of the above-mentioned elliptical recording pit, the area of a recording pit for the elliptical shape is reduced in comparison with that for a circular recording pit. Therefore the signal intensity of the single recording pit decreases inevitably and S/N becomes poor. Since the direction of the elliptical shape is detected by a plurality of detectors, the increased multi-level results in considerably reduced difference of pattern between each direction, and leads to a weak signal which is to be received by detectors. As a result, a large multi-level generates insufficient detection accuracy, and a large multi-level cannot be expected. As described hereinabove, the method in which multi-level data is recorded in a single recording pit by means of in-plane recording method is involved not only in a difficulty of high rate transfer but also in that of high density recording.

Accordingly, it is the object of the present invention to provide an optical recording method and an optical recording apparatus for realizing high density recording and high speed recording and an optical reading method and an optical reading apparatus for realizing high speed reading.

SUMMARY OF THE INVENTION

The inventors of the present invention were engaged in research and development of multi-level recording to solve the above-mentioned problems. As a result, it was found that a recording light having the spatial polarization distribution was irradiated onto an optical recording medium which exhibited photo-induced birefringence and then a reading light having an arbitrary uniform polarization direction was irradiated onto the optical recording medium, thereby the transmitted light having the polarization distribution corresponding to that of the recording light was obtained, and thus the present invention was accomplished.

In detail, in an optical recording method in accordance with the present invention, a recording light comprising a plurality of polarization distributions and the recording light is irradiated onto an optical recording medium to thereby record the recording light comprising the plurality of polarization distribution on the recording medium as the photo-induced birefringence distribution. More preferably, the recording light which has been subjected to Fourier transformation is irradiated onto the optical recording medium. The recording light is formed so as to have a two-dimensional polarization distribution formed correspondingly to the data information.

The optical recording medium contains at least one layer of optical recording material which exhibits photo-induced birefringence. The thickness of the optical recording material satisfies the relation $\Delta n \cdot d = (m+\frac{1}{2}) \cdot \lambda$ or the relation $\Delta n \cdot d = (m+\frac{1}{4}) \cdot \lambda$, where m denotes an integer of 1 or larger, $\lambda$ denotes a wavelength of the reading light, and $\Delta n$ denotes birefringence change induced by the light. A polymer or polymeric liquid crystal having an isomerizable side chain or a polymer in; which photoisomerizable molecules are dispersed is used as the optical recording material. The isomerizable group or molecule contains an azobenzene structure. The polymer or polymeric liquid crystal is at least polymerized products selected from a group of polyesters.

An optical recording apparatus in accordance with the present invention is provided with a light source for emitting a coherent light, a spatial light modulator for polarization modulating the light from the light source correspondingly to the data information to obtain a recording light, and a focusing optical system for irradiating the recording light onto an optical recording medium. The focusing optical system is preferably structured so that the recording light is subjected to Fourier transformation. The spatial light modulator is structured with a opto-electric conversion material having transparent electrodes formed on both sides thereof. For example, a liquid crystal is used as the opto-electric conversion material.

An optical recording apparatus in accordance with the present invention is provided with an optical recording head having a light source for emitting a coherent light, a spatial light modulator for polarization modulating the light from the light source correspondingly to the data information to obtain a recording light, and a focusing optical system for irradiating the recording light onto an optical recording medium, a head moving mechanism for moving the optical recording head in the radial direction of the optical recording medium, and a medium driving mechanism for driving the optical recording medium. The optical recording medium may be a disc-shaped optical recording medium, and the optical recording medium may be incorporated in the optical recording apparatus.

In an optical reading method in accordance with the present invention, a reading light having a uniform polarization distribution is generated, the reading light is irradiated onto an optical recording medium having a photo-induced birefringence, and the polarization distribution of the transmitted light or reflected light from the optical recording medium is read as the polarization distribution of a reproducing light. Preferably, the reading light which has been subjected to Fourier transformation is irradiated onto the optical recording medium. In this case, the transmitted light or reflected light is subjected to inverse Fourier transformation. The polarized reading light is a linearly polarized light having a certain arbitrary direction. The transmitted light or reflected light is split into two orthogonal polarization components, light intensities of both of the polarization components are compared with each other and calculated, and the comparison and calculation result is read.

An optical reading apparatus in accordance with the present invention is provided with a reading optical system for irradiating a reading light onto an optical recording medium where a recording light having the data information in the form of spatial polarization distribution is recorded in the form of photo-induced birefringence, and a photo-detector for detecting the polarization distribution of the transmitted light from the optical recording medium. Otherwise, an optical reading apparatus is provided with a reading optical system for irradiating a reading light onto an optical recording medium where a recording light having the data information in the form of spatial polarization distribution is recorded in the form of photo-induced birefringence, an optical element for receiving the reflected light from the optical recording medium, and a photo-detector for detecting the polarization distribution of the reflected light from the optical element.

The reading optical system has a spatial light modulator for forming a linearly polarized reading light having an arbitrary direction. The photo-detector is for detecting the polarization distribution of the transmitted light through the polarizing beam splitter and comprises two photo-detectors for separately detecting two orthogonal polarization components split by the polarizing beam splitter. The detected outputs of these respective two light detectors are compared and calculated by the comparison calculation unit and the reproducing polarization distribution is read.

By applying the above-mentioned methods and apparatus, the optical recording method, optical recording apparatus, optical reading method, and optical reading apparatus which are capable of high density recording and high speed recording, and high speed reading are obtained.

BRIEF DESCRIPTION OF THE DRAWINGS

FIG. 2A to FIG. 2I are diagrams for illustrating polarization of respective transmitted lights.

DETAILED DESCRIPTION OF THE PREFERRED EMBODIMENTS

Though embodiments of the present invention will be described in detail hereinafter, first, the principle of the present invention is described.

Figure 1:
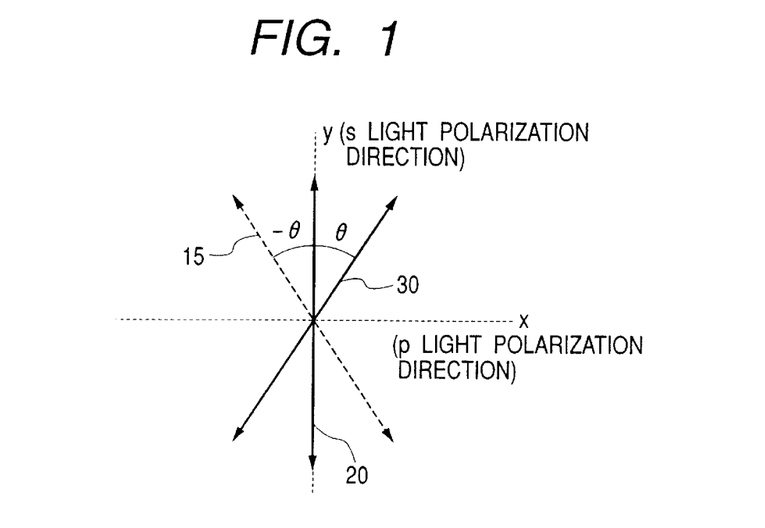
FIG. 1 is a diagram for illustrating the polarization direction of-the recording light and reading light.

An optical recording medium used in the present invention is formed of a material which is photo-induced birefringent and records and retains the birefringence. Herein, the term "photo-induced birefringence" means that an anisotropic refractive index is induced in an originally isotropic medium irradiated with a polarizing light. FIG. 1 shows the polarization direction of a recording light and reading light. As shown in FIG. 1, when a recording light 20 having linearly polarized light in y-axis direction (referred to as s polarization direction hereinafter) is irradiated onto a photo-induced birefringent material, the birefringence $\Delta n$ is induced in y-axis direction and it is recorded. Then, a reading light 30 ($A_{read}$) represented by the equation (1) described hereunder having a polarization direction which makes an angle of $\theta$ with respect to y-axis is irradiated.

[Equation 1]

$$A_{read} = \hat{x}A\sin\theta e^{i(k_0 z - \omega t)} + \hat{y}A\cos\theta e^{i(k_0 z - \omega t)} \qquad \text{(equation 1)}$$

Wherein, A denotes amplitude of a reading light, $k_0$ denotes wave number in vacuum, $\omega$ denotes angular frequency, and t denotes time. The transmitted light 15 ($A_{out}$) which has passed a medium where $\Delta n$ has been recorded is given by the equation (2) described hereunder.

[Equation 2]

$$A_{out} = \hat{x}A\sin\theta e^{i(k_0 z - \omega t)} + \hat{y}A\cos\theta e^{i(k_0 z - \omega t + \frac{2\pi}{\lambda}\Delta nd)} \qquad \text{(equation 2)}$$

Wherein, $\lambda$ denotes wavelength and d denotes thickness of a recording medium. For purpose of simplification, no absorption of the optical recording medium is assumed. In FIG. 2A to FIG. 21, the polarization of the transmitted light 15 ($A_{out}$) for the case that $\Delta n$ increments from 0 $\lambda/8$ by $\lambda/8$ calculated based on the above-mentioned equation (2) is shown. As shown in FIG. 2A to FIG. 2I, it is found that when the magnitude of $\Delta n$ is $\lambda/2$ the polarization plane of the reading light 30 and the polarization plane of the transmitted light 15 are symmetrical with respect to y-axis. The symmetry is equivalent to the effect of a half-wave plate, which is usually used for polarization rotation, a half-wave plate exhibits an effect to symmetrize the polarization direction of the transmitted light with the polarization direction of the incident light, namely an effect of $-\theta$ rotation with respect to the orientation of the half-wave plate when the orientation of the half-wave plate is adjusted to $\theta$ with respect to the polarization direction of the incident light.

Therefore, as shown in FIG. 1, if refraction change is induced so that $\Delta nd$ is $\lambda/2$ in y-axis direction by irradiating a linearly polarized light in y-axis direction onto an optical recording medium, the polarization direction of the linearly polarized light inclined by θ degrees with respect to y-axis is rotated in −θ direction. Based on this principle, for example, recording lights having different polarization angles α, β, and γ are irradiated onto three recording pits for recording, and the pits are read out by use of a linearly polarized light having a polarization angle of 0 degree, at that time, the polarization angles of these transmitted lights 2α, 2β, and 2γ are read out, therefore it is possible to record multi-level by means of polarization angle for each pit. In this case, the polarization angle in a range from 0 to 90 degrees can be used, and is two order or more magnitude higher than that of the conventional art in which magneto-optical Kerr effect is used. Therefore multi-level of two order or more magnitude higher than the conventional art is possible, and high density recording and large capacity can be attained. For example, 90 polarization angles in the range from 0 to 90 degrees with 1 degree interval is set. Such 90 polarization angles can represents 90 bits by coding, and can be the number to base 90 or coded number of binary to n-th power.

The present invention is to record/reproduce multi-level data by means of polarization angle of linearly polarized light based on the principle described hereinabove. The present invention is advantageous in that the dynamic range is large and S/N is high. Embodiments of the present invention will be described in detail hereinafter.

[Optical Recording Method and Optical Reading Method]

Figure 3A:
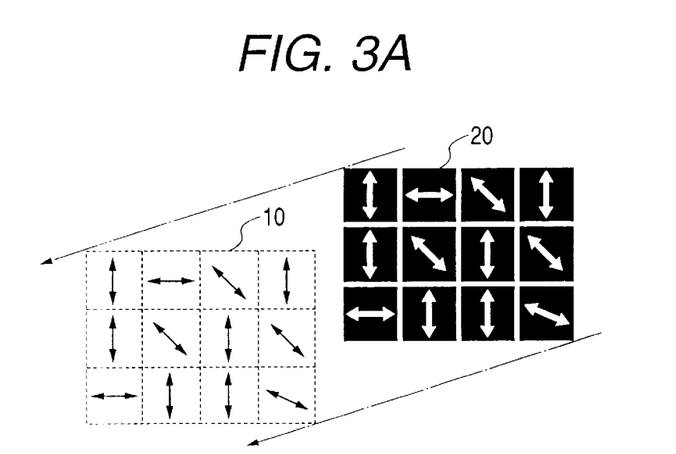
FIG. 3A and FIG. 3B are diagrams for illustrating one example of the respective optical recording method and optical reading method in accordance with the present invention.
Figure 3B:
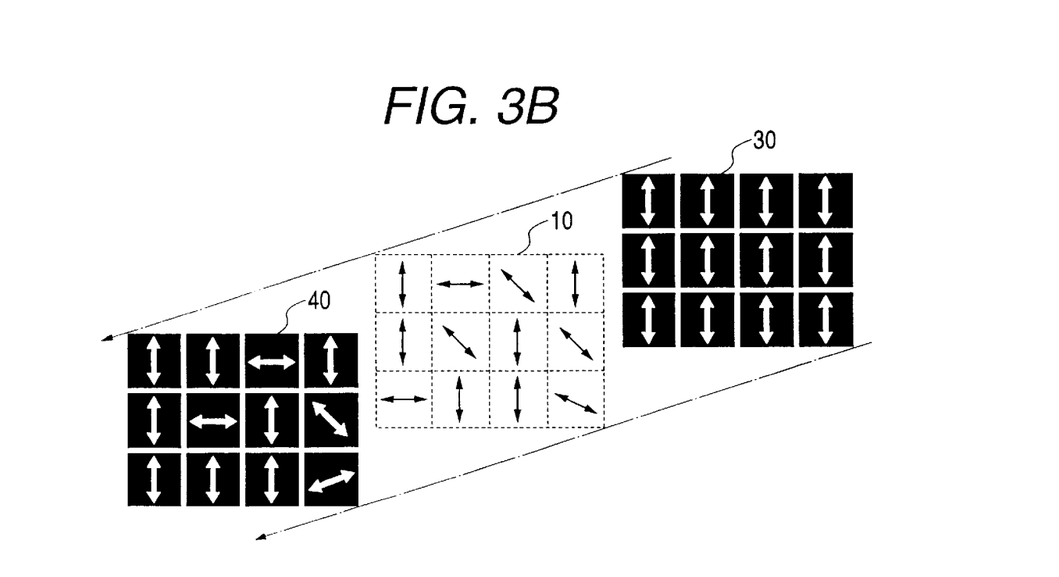

FIG. 3A and FIG. 3B are diagrams for illustrating one embodiment of an optical recording method and an optical reading method of the present invention respectively. The arrows in the diagrams show the polarization directions in pits respectively. In a usual optical disc, 1 pit is recorded in 1 recording area, and the pit is read one by one in reading, therefore recording and reproduction are slow. In the present invention, because plural pieces of multi-value data are recorded/reproduced at a time, recording and reproduction are fast. In detail, in recording operation, as shown in FIG. 3A, a recording light 20 having the two-dimensional (in the drawing 4×4) polarization distribution is irradiated onto an optical recording medium 10, the birefringence is induced by irradiation of the polarized light in recording pits in the optical recording medium. The birefringence change Δn induced at that time satisfies the relation Δnd=λ/2 as described hereinabove, and the birefringence change Δn is induced in the same directions as polarization directions of respective recording lights. In reproduction, as shown in FIG. 3B, when a reading light 30 having the uniform linearly polarization plane is irradiated on pits of an optical recording medium 10, the polarization angle of the reading lights is turned correspondingly to the polarization angles of the recording lights on respective recording pits when the reading light passes through the optical recording medium 10. When areas where the polarization directions α, β, and γ have been recorded are read, the polarization directions 2α, 2β, and 2γ of the reproducing lights 40 are obtained. In other words, the polarization distribution of the reproducing light 40 is equal to the polarization distribution rotated double the polarization, angle of the polarization distribution of the recording light 20. Because a plurality of multi-level pits are read at a time as described hereinabove, for example, if multi-level 1000×1000 bit data is reproduced at a time, the recording and reading are 6 order of magnitude faster than the one-by-one recording and reading of pits.

Since the smallest size of 1 pixel of currently usable spatial light modulator requires the size of several ten $\mu m^2$, the data recording of 1 bit requires the recording area of several ten $\mu m^2$. Therefore, the higher recording density is desired, and to realize the high recording density the inventors of the present invention have developed with emphasis also on this point. As a result, it is found that when the spatial polarization distribution of a recording light is Fourier-transformed by use of a lens and recorded as the photo-induced birefringence in a small area, the recorded polarization distribution,is read correctly. An example based on this finding is described hereunder.

Figure 4A:
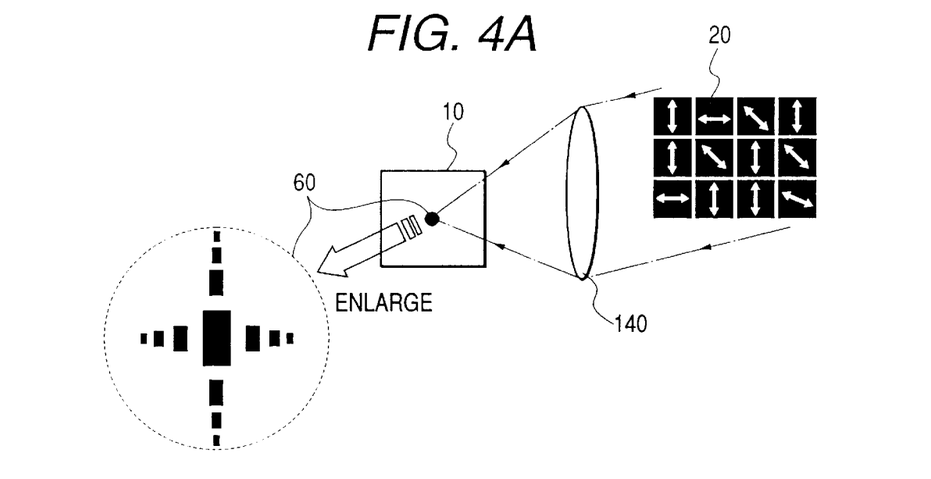
FIG. 4A and FIG. 4B are diagrams for illustrating another example of the respective optical recording method and optical reading method in accordance with the present invention.
Figure 4B:
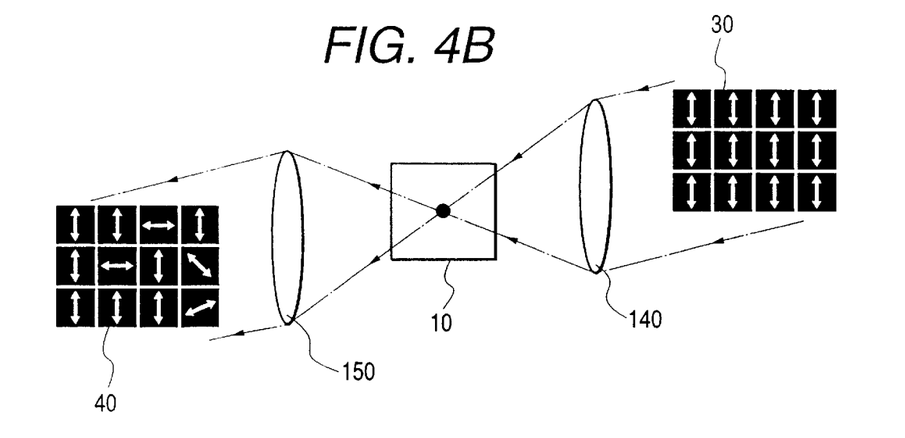

FIG. 4A and FIG. 4B are diagrams for illustrating another embodiment of the optical recording method and the optical reading method of the present invention respectively. In the present example, as shown in FIG. 4A, a recording light 20 having two-dimensional polarization distribution is subjected to,Fourier transformation by use of a lens 140 and irradiated onto an optical recording medium 10. The Fourier transformed image 60 of the recording light 20 having the information in the form of polarization distribution is focused on the small area as shown in the enlarged view. The photo-induced birefringence corresponding to the Fourier transformed image of the signal light having the polarization distribution is induced and recorded in the optical recording medium 10. The inventors of the present invention found that the photo-induced birefringence had the polarization distribution corresponding to the spatial polarization distribution of the recording light, and the present invention is based on this principle.

When the data is read, a reading light 30 having a uniform polarization as shown in FIG. 4B is generated by use of the spatial light modulator, and subjected to Fourier transformation by use of the lens 140 in the same manner as used in recording, and the Fourier transformed image is irradiated onto the optical recording medium 10. The polarization distribution of the Fourier transformed image of the reading light 30 is converted to that of the recording light by passing through the optical recording medium 10. The transmitted light from the optical recording medium 10 is subjected to inverse Fourier transformation by use of the lens 150, and the reproduction light 40 is obtained on the focal plane. The polarization: angles of reproduction light 40 of respective pits are detected by a detector to read the data.

Because the polarization distribution of the recording light 20 is focused by the lens 140, it is possible to record a plurality of pits in a small area, and the sufficient high density recording can be attained. For example, in the case that a recording light 40 consisting of 640×480 pits of 40×40 $\mu m^2$ each is recorded by means of Fourier transformation at a time, assuming that the Fourier transformed image 60 has a diameter of 1 mm φ, then the high density recording as high as approximately 600 times that of the conventional recording is achieved.

[Optical Recording Medium]

Polymers or polymeric liquid crystals having a photoisomerization group on side chain, and polymer materials in which photoisomerization molecules are dispersed have been known as examples of the optical recording material used in the present invention. These materials are macroscopically isotropic, but when a linearly polarized light is irradiated, the photoisomerization is induced to cause anisotropic refractive index. Group or molecule which exhibits significant birefringence due to isomerization is desirable as the photoisomerizable group or molecule, for example, group or molecule which contains an azobenzene structure is preferably used. As the polymer or polymeric liquid crystal material for having photoisomerizable group or molecule, the polymer or polymeric liquid crystal in which the induced anisotropy of a photoisomerizable group is transmitted to the polymer or polymeric liquid crystal, and as a result a significant magnitude of birefringence is caused on over the entire polymer or polymeric liquid crystal and the birefringence is recorded, is desirably used. For example, polymer or polymeric liquid crystal which is a polymer formed by polymerization of a monomer selected from a group of polyesters, or polymethyl methacrylate or polyvinyl alcohol is preferably used. For example, azobenzene is described as an example of the photoisomerizable group.

Figure 5A:
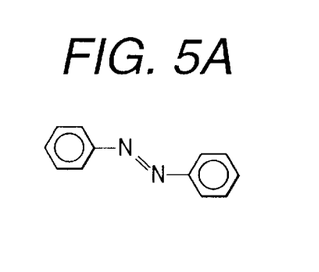
FIG. 5A and FIG. 5B are diagrams for describing the chemical structure of respective trans-form and cis-form of azobenzene.
Figure 5B:
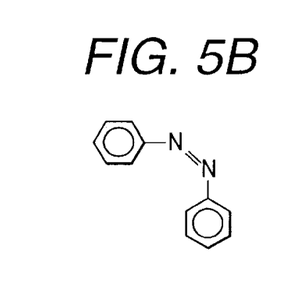

Azobenzene exhibits trans-cis photoisomerism. The molecular structure of trans-form is shown in FIG. 5A, and on the other hand, the molecular structure of cis-form is shown in FIG. 5B.

Figure 6A:
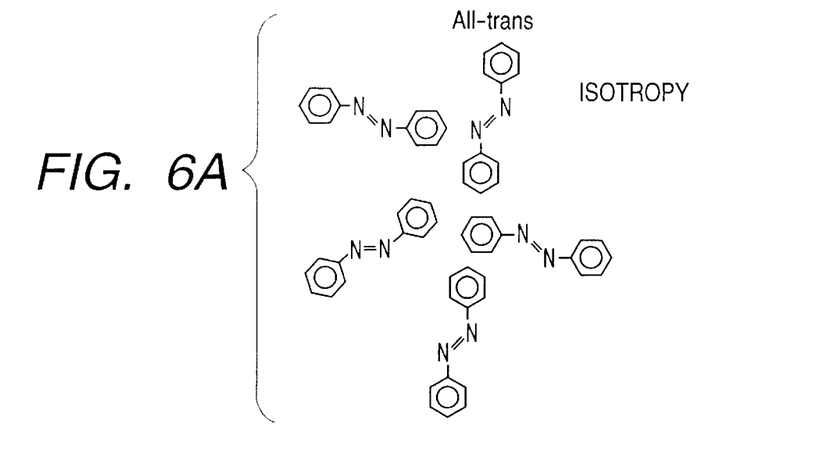
FIG. 6A and FIG. 6B are diagrams for describing the photo-induced birefringence.
Figure 6B:
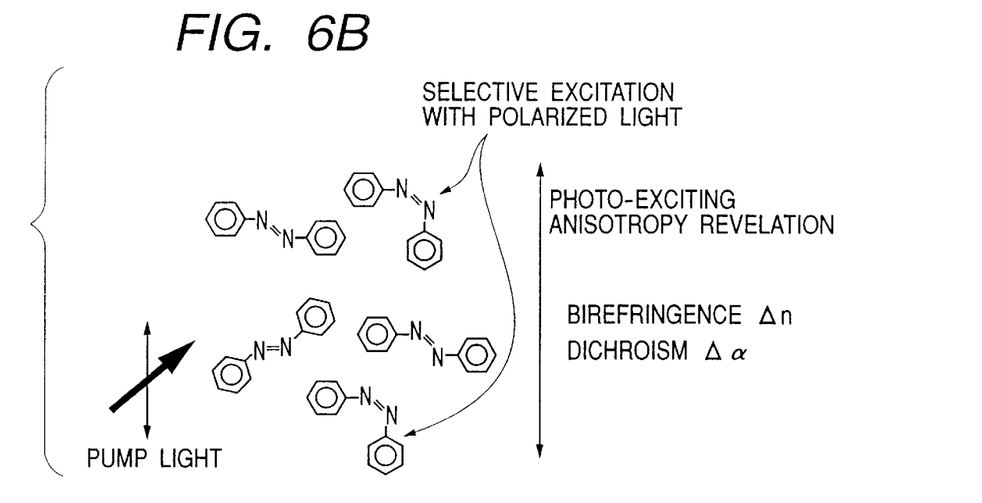

Azobenzene exhibits isomerism alone, but azobenzene which is dispersed randomly in a recording material as shown in FIG. 6A is isotropic as the whole of the recording material. Before excitation, the majority is trans-form azobenzene in a recording material. Trans-form is converted to cis-form by photo-excitation, and cis-form increases in the material. In particular, when a linearly polarized pump light which is polarized in a certain direction is irradiated onto the material, as shown in FIG. 6B, only azobenzene which is oriented in the same direction as that of the polarization direction absorbs the light and is converted to cis-form. In this case, the birefringence caused by isomerization of azobenzene and the birefringence of polymer or polymeric liquid crystal induced by isomerization of azobenzene are combined together to cause large birefringence in the optical recording medium with respect to the axis in the polarization direction. As described hereinabove, the polymer film functions as a wavelength plate as described hereinbefore by utilizing the birefringence caused as described hereinabove.

Figure 7:
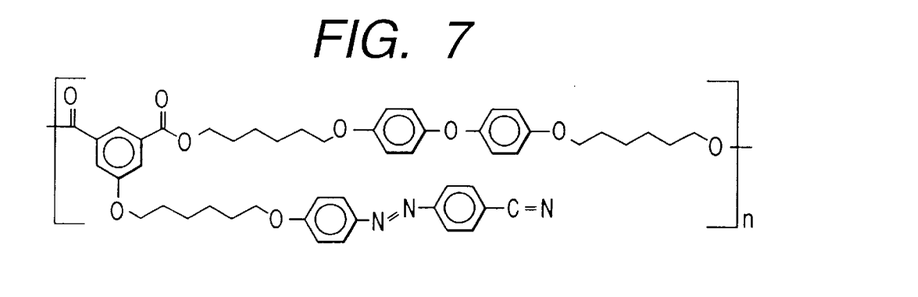
FIG. 7 is a diagram for illustrating an optical recording medium used in the present invention.

Any material may be used as the optical recording medium as long as the material exhibits photo-induced birefringence and it is recorded and retained. Herein, a polyester having cyanoazobenzene units in the side chain shown in FIG. 7 is described as an example. This material is described in OPTICAL REVIEW, Vol. 2, No. 6, (1995), pp. 460 to 462, and has been known as a phase-conjugate mirror having recording characteristics. The inventors of the present invention confirmed that polyester having cyanoazobenzene units in the side chain exhibited photo-induced birefringence and it is recordable by use of an optical system shown in FIG. 8.

Figure 8:
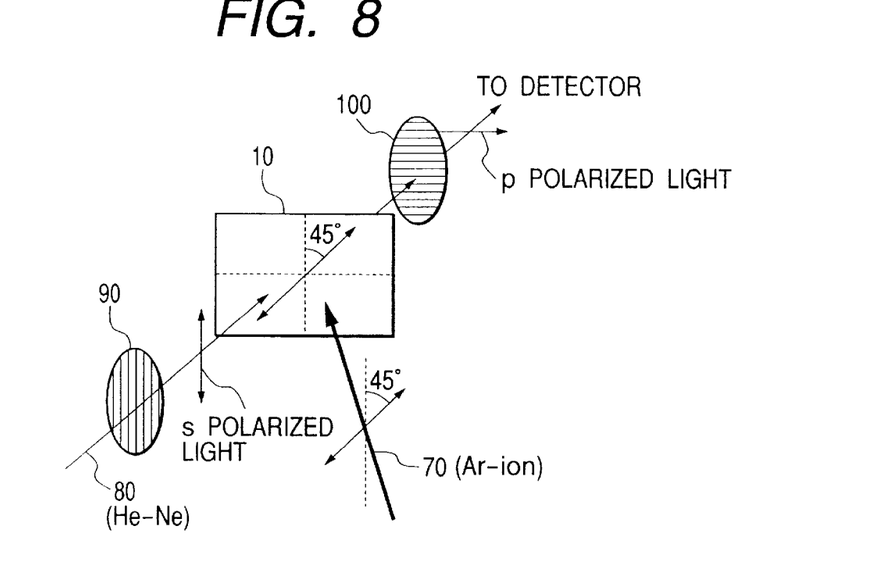
FIG. 8 is a diagram for illustrating an optical system for measurement of photo-induced birefringence.

In FIG. 8, the wavelength 515 nm of an argon ion laser to which polyester having cyanoazobenzene units in the side chain is sensitive was used as the pump light 70 for inducing the birefringence of an optical recording medium 10. The wavelength 633 nm of a helium neon laser which is not sensitive to the recording medium was used as a probe light 80 for measuring the birefringence. As shown in the drawing, the optical recording medium 10 was placed in the optical path of the helium neon laser, a polarizer 90 and an analyzer 100 were placed in front and rear of the optical recording medium 10 respectively. Herein, the orientation of the polarizer 90 is denoted by s polarization and the orientation of the analyzer 100 is denoted by p polarization, and both orientations were perpendicular to each other. In this condition, the polarization direction of the probe light 80 cannot pass through the analyzer 100 unless the optical recording medium 10 is anisotropic.

The polarization direction of the pump light 70 was rightly intermediate between s polarization and p polarization namely 45 degrees, and the pump light 70 was irradiated onto the optical recording medium 10 to induce the photo-induced birefringence. The pump light intensity was set to be 5 W/cm². At that time, the polarized light of the probe light 80 (light power $I_0$) was rotated due to the birefringence induced in the optical recording medium 10, and passed the analyzer 100. The light power I passing the analyzer 100 is represented by the equation (3) described hereunder.

[Equation 3]

$$I = I_0 \sin^2\left(\frac{\pi \Delta n d}{\lambda}\right) \quad \text{(equation 3)}$$

Figure 9:
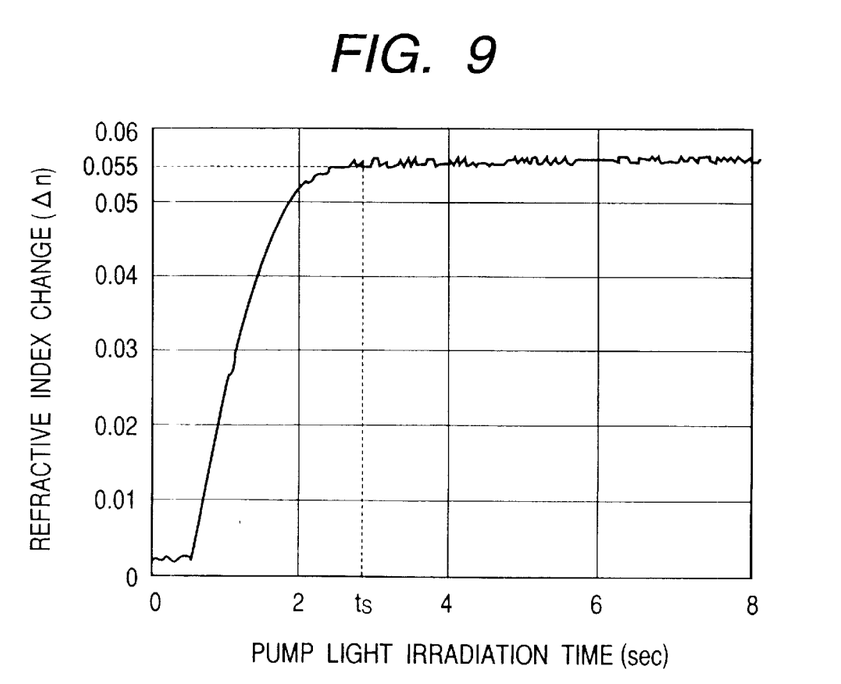
FIG. 9 is a graph for describing the photo-induced birefringence of polyester having cyanoazobenzene units in the side chain.

The thickness of the optical recording medium 10 was 2 μm, and the resultant photo-induced birefringence calculated based on the equation (3) is shown in FIG. 9. The refractive index change is the value for wavelength of 633 nm. The axis of abscissa in the drawing represents the irradiation time of the pump light, and the axis of ordinate represents the magnitude of refractive index change obtained by the measurement. As shown in the drawing, it is obvious that the refractive index change Δn due to birefringence induced by the pump light 70 increases with time and saturates at the time $t_s$. The time $t_s$ can be shortened by increasing the pump light intensity. The saturation birefringence change Δns of about 0.055 is obtained from this graph. It was confirmed that the birefringence change could be retained semi-permanently under natural light in room temperature. As described hereinabove, polyester having cyanoazobenzene units in the side chain exhibits photo-induced birefringence and it is recorded, therefore this material is preferable as the optical recording medium used for the present invention.

Figure 11A:
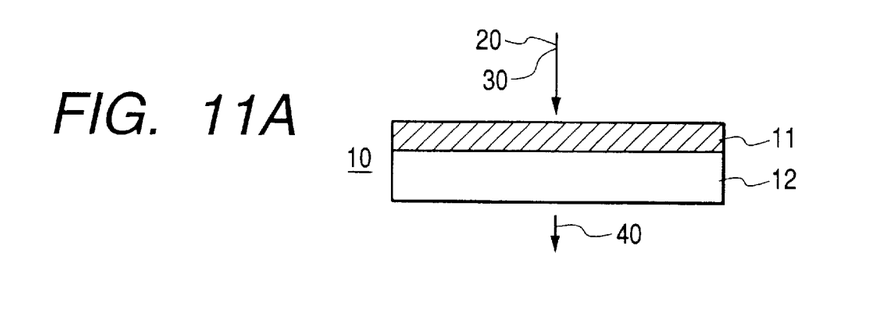
FIG. 11A and FIG. 11B are diagrams for illustrating an exemplary structure of an optical recording medium.

FIG. 11A shows a diagram for illustrating an example of an optical recording medium 10 in accordance with the present invention. In this example, as shown in the drawing, an optical recording medium 10 is formed by casting an optical recording layer 11 which exhibits photo-induced birefringence on one side of a transparent substrate 12 such as a glass plate. In this case, as shown in the drawing, a recording light 20 and reading light 30 are incident from the optical recording layer 11 side, and a reproducing light 40 comes out as the transmitted light of the reading light 30.

Figure 2:
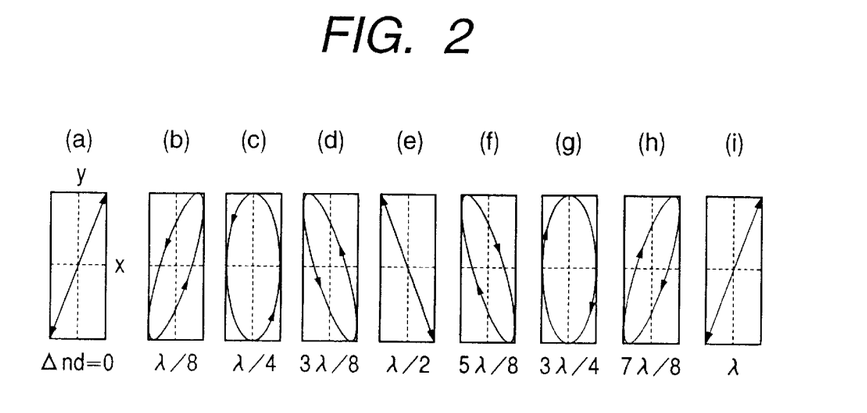

In this example, the photo-induced birefringence of the optical recording medium 10 is induced by irradiating a recording light 20 having polarization distribution, and then the photo-induced birefringence recorded in the optical recording medium 10 is read out by transmission of the reading light 30 having uniform polarization distribution through the optical recording medium 10. As shown in FIG. 2, when the magnitude of the product Δnd of the refractive index difference Δn and the film thickness d is equal to λ/2, the orientation of the linearly polarized light can be rotated. Therefore, it is necessary to adjust the thickness d of the optical recording layer 11 of the optical recording medium 10 so as to satisfy the relation represented by the equation (4) described hereunder.

[Equation 4]

$$\Delta n d = \left(\frac{1}{2} + m\right)\lambda \quad (m \text{ is an integer}) \quad \text{(equation 4)}$$

If this relation is not satisfied, the polarized light read out is an elliptically polarized light. Because the data is represented by the polarization angle, the accuracy of the polarization angle detection becomes poor. It is known based on the result shown in FIG. 9 that Δns is equal to 0.055 for the polyester having cyanobenzene units in the side chain. Therefore, in the case that polyester having cyanobenzene units in the side chain is used as an optical recording layer 11 of the optical recording medium 10, the film thickness of 5.75 µm is most suitable based on the equation (4). The relation $\Delta nd=\lambda/2$ is satisfied always in the exposure time t of the time $t_s$ or longer while the refractive index change $\Delta n$ attains the saturation refractive index change $\Delta ns$ as long as the thickness of the optical recording layer 11 is adjusted to this film thickness.

Figure 10:
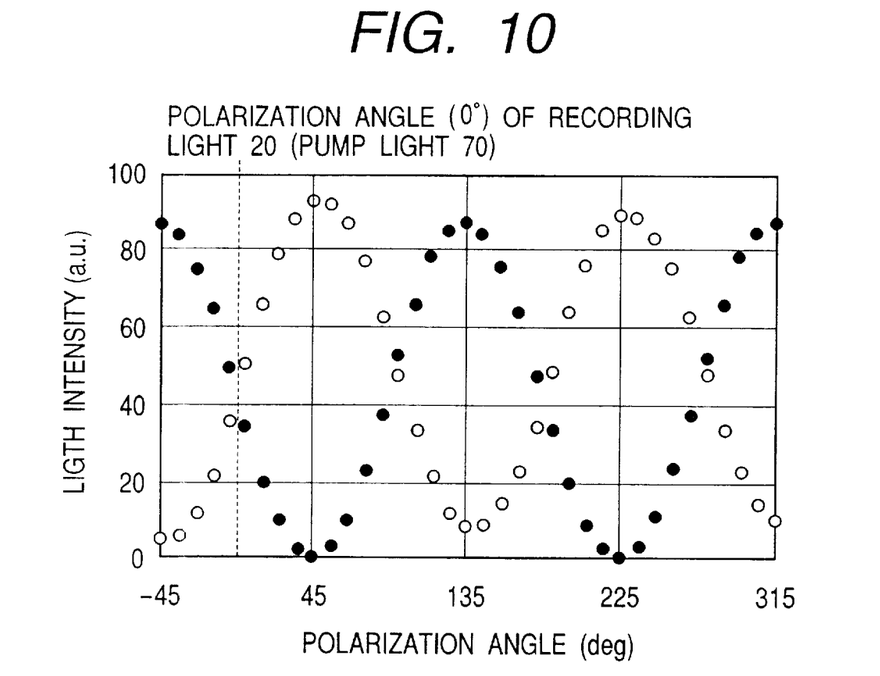
FIG. 10 is a graph for describing the relation between the polarization angle of the recording light and reading light.

The film thickness of the optical recording layer 11 was set as described hereinabove, the photo-induced birefringence was recorded again by use of the optical system shown in FIG. 8 and with exposure time of $t_s$ or longer while the pump light 70 (recording light 20) was irradiated onto polyester having cyanobenzene units in the side chain. The polarization angel of the transmitted light was examined with rotation of the analyzer 100 shown in FIG. 8, and the experimental result is shown in FIG. 10. In FIG. 10, the mark • denotes the polarization angle of the transmitted light of a sample before the recording light 20 (pump light 70) is irradiated onto the sample, namely, the polarization angle of the reading light 30, and the polarization angle of the reading light 30 is inclined −45 degrees with respect to the polarization angle of the recording light 20. In FIG. 10, the mark o denotes the polarization angle of the reading light 30 which has passed through the sample after the recording light 20 (pump light 70) is irradiated, the polarization angle is inclined +45 degrees with respect to the polarization direction of the recording light 20. Therefore, as described for FIG. 1 and FIG. 2, it is obvious that the optical recording medium 10 functions as an induced half-wave plate.

Figure 11B:
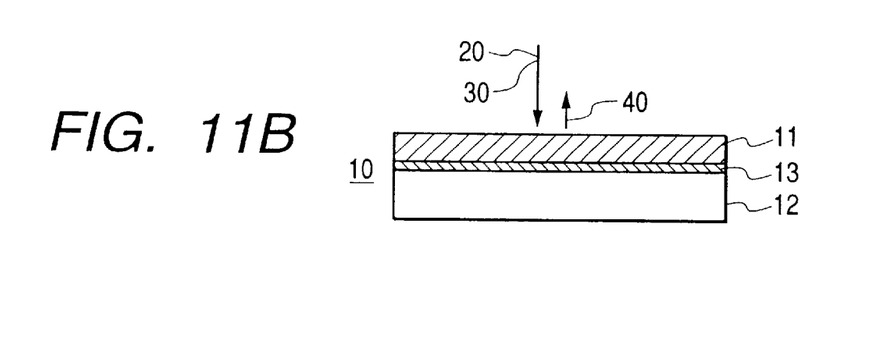

FIG. 11B is a diagram for showing another example of the optical recording medium in accordance with the present invention. In the present example, as shown in the drawing, a reflection layer 13 is formed on one side of a transparent substrate 12 such as a glass substrate, and an optical recording layer 11 is formed on the reflection layer to form an optical recording medium 10. In this case, as shown in FIG. 11B, a recording light 20 and a reading light 30 are incident on the optical recording layer 11 side, and a reproducing light 40 comes out from the reflection layer 13 as a reflected light of the reading light 30.

The recording light 20 is reflected by the reflection layer 13 of the optical recording medium 10 to pass through the optical recording medium 10 twice, and the photo-induced birefringence of the optical recording medium is generated. To read the data, the reading light 30 having the uniform polarization distribution is reflected on the optical recording medium 10 to read the photo-induced birefringence. In this case, because the recording light 20 and the reading light 30 pass the optical recording medium 10 twice due to reflection, the orientation of the linearly polarized light can be rotated when the magnitude of the product $\Delta nd$ of the refractive index change $\Delta n$ and the film thickness d is equal to $\lambda/4$. Therefore, it is necessary to adjust the thickness d of the optical recording layer 11 of the optical recording medium 10 so as to satisfy the relation represented by the equation (5) described hereunder.

[Equation 5]

$$\Delta nd = \left(\frac{1}{4}+m\right)\lambda \quad (m \text{ is an integer}) \quad \text{(equation 5)}$$

If this relation is not satisfied, the polarized light read out is an elliptically polarized light. Because the data is represented by the polarization angle, the accuracy of the polarization angle detection becomes poor if the polarized light read out is an elliptically polarized light. Therefore, in the case that polyester having cyanobenzene units in the side chain is used as an optical recording layer 11 of the optical recording medium 10, the film thickness of 2.88 µm is most suitable based on the equation (5).

In any case shown in FIG. 11A or FIG. 11B, the optical recording medium 10 is formed in the shape of sheet as a whole namely the shape having a wide area and having a thin thickness. The optical recording medium 10 is formed in the shape of a disk.

[Optical Recording Apparatus]

Figure 12:
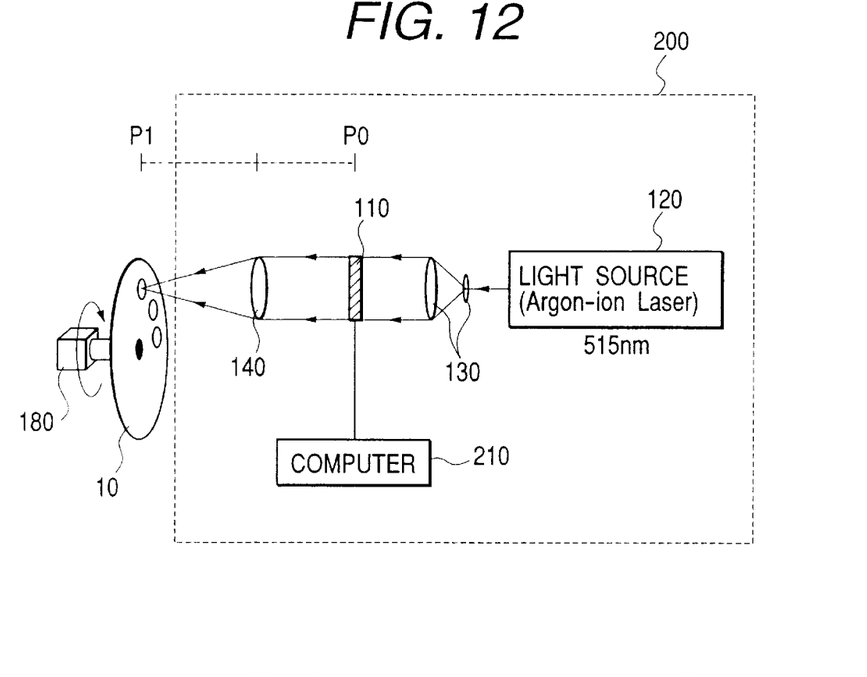
FIG. 12 is a diagram for illustrating one example of an optical recording medium in accordance with the present invention.
Figures 13, 14:
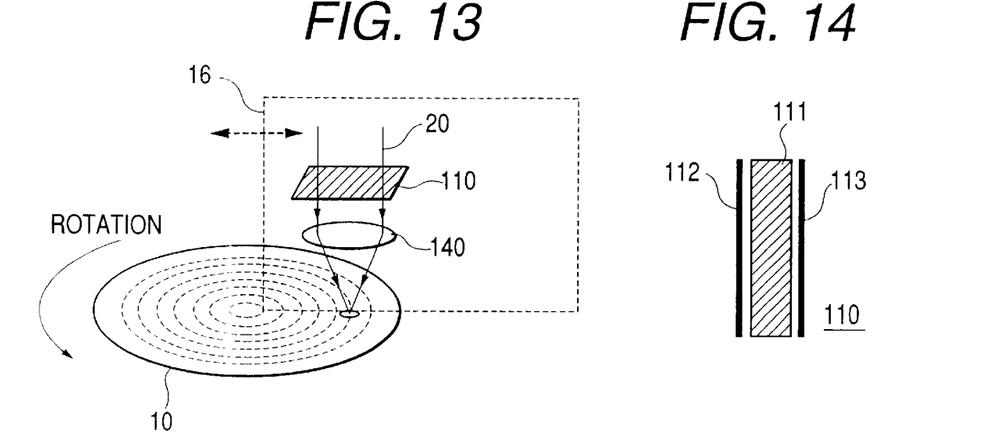
FIG. 13 is a diagram for illustrating the forming of recording tracks.
FIG. 14 is a diagram for illustrating an exemplary structure of a spatial light modulator.

FIG. 12 and FIG. 13 are diagrams for illustrating an example of an optical recording apparatus in accordance with the present invention. As shown in FIG. 12, an optical recording head 200 comprises a light source 120, lenses 130 and 140, a spatial light modulator 110, and a computer 210. The optical recording medium 10 is formed in the disc-shape, and rotated in the circumferential direction by a motor 180. As shown in FIG. 13, the optical head is moved in the radial direction of the optical recording medium 10 by a movable unit 16. A light source which emits coherent light having a wavelength to which the optical recording medium 10 is sensitive may be used as the light source 120. In this example shown in FIG. 12, the wavelength of 515 nm of an argon ion laser is used. The laser light emitted from the light source is collimated by two lenses 130, and entered to the spatial light modulator 110. A voltage address type liquid crystal panel or an electro-optical crystal having a matrix electrode may be used as the spatial light modulator 110. In this example, a liquid crystal spatial light modulator 110 as shown in FIG. 14 is used. The liquid crystal spatial light modulator 110 comprises a opto-electric conversion material 111 such as a liquid crystal layer, and transparent electrodes 112 and 113 located on both sides of the opto-electric conversion material 111, which is used for modulating the polarization of the incident light.

Figure 15A:
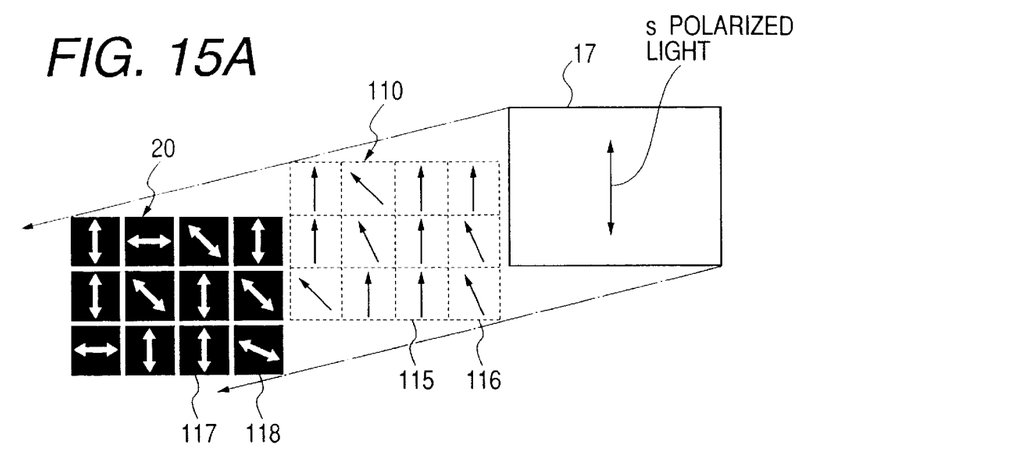
FIG. 15A and FIG. 15B are diagrams for illustrating the polarization distribution of a recording light.
Figure 15B:
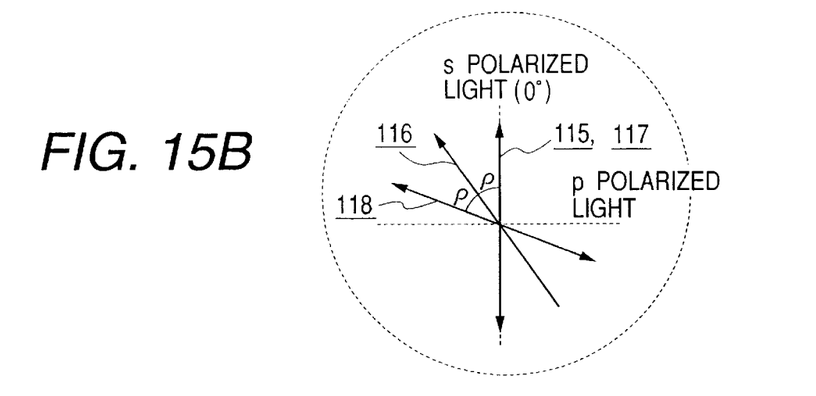

The computer 210 codes the data information to be a two-dimensional digital data pages, and converts it to two-dimensional analog data information, and then sends to the spatial light modulator 110. The data pages are displayed on the spatial light modulator 110, and the polarization of the incident light upon the spatial light modulator 110 is modulated two-dimensionally corresponding to data pages. An example of data display is shown in FIG. 15A and FIG. 15B. As shown in FIG. 15A, the polarization direction of the incident light 17 is s polarization (0 degree), the polarization distribution shown in the recording light 20 is recorded after passing the spatial light modulator 110. Each pixel of the spatial light modulator 110 functions as a half-wave plate, the orientation of each pixel can be rotated arbitrarily by applying a voltage. One pixel 115 is addressed in FIG. 15A. As shown in FIG. 15B, the orientation of the pixel 115 is 0 degree with respect to the polarization direction of the incident light and the polarization direction before incidence upon the spatial light modulator 110 is s polarization (0 degree), therefore the polarizations direction 117 of the light which passes the pixel 115 is 0 degree. On the other hand, another pixel 116 is addressed. The orientation of the pixel 116 is ρ with respect to the polarization direction of the incident light, and the polarization direction 118 of the light which passes the pixel 116 is 2ρ. As described hereinabove, the spatial light modulator can generate the polarized light in the arbitrary direction for each pixel.

Figure 16:
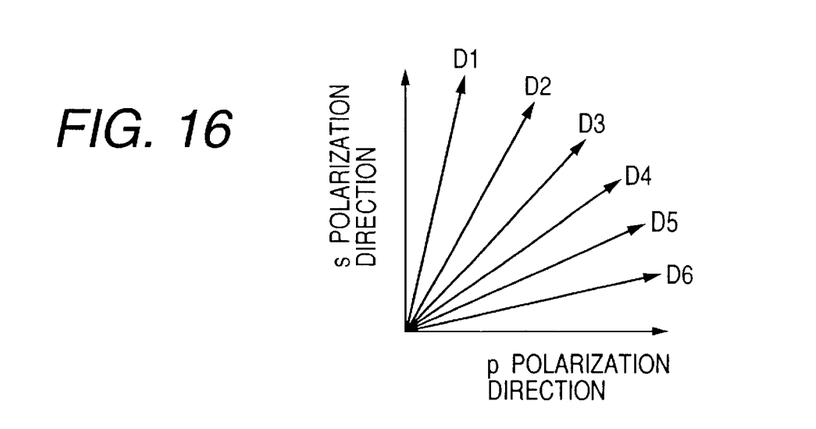
FIG. 16 is a diagram for describing the data recording formed by rotating the polarization angle of a recording light.

For example, as shown in FIG. 16, six polarization angles as shown with vectors D1 to D6 are set as the polarization angle of the signal light in the range of 90 degrees from s polarization direction to p polarization direction including s polarization direction (0 degree) and p polarization direction (90 degrees). These six polarization angles can be coded to represent six bits, and can be the number to base 6 or coded number of binary to sixth power. In the drawing, a polarized signal light formed in one pixel of the spatial light modulator is shown. By using the spatial light modulator, multi-value polarization angles are generated in a plurality of pixels.

The polarization distribution of the recording light 20 generated by the spatial light modulator 110 is subjected to Fourier transformation by use of the lens 140, and recorded in the optical recording medium 10. In the optical recording medium 10, the photo-induced birefringence corresponding to the recording light 20 is induced and recorded. The recording light intensity I and recording time t are set so that the optical recording medium functions as a half-wave plate. The relation among the recording light intensity I, recording time t, and birefringence Δn is obtained from FIG. 9 for the case that polyester having cyanoazobenzene units in the side chain is used for the optical recording layer. In the case of transmission type recording/reproduction shown in FIG. 11A, the condition is set so that the relation represented by the equation (4) is satisfied, and on the other hand, in the case of reflection type recording/reproduction as shown in FIG. 11B, the condition is set so that,the relation represented by the equation (5) is satisfied. When the condition is satisfied, the reading light is converted to a linearly polarized light which is formed by rotating the polarization angle of the linearly polarized reading light in reading out operation.

By rotating the optical recording medium 10 by use of the motor 180 shown in FIG. 12, a plurality of data pages are recorded with changing the place of the optical recording medium 10 in the circumferential direction. Furthermore, by moving the optical recording head 200 in the radial direction of the optical recording medium 10, the data is recorded so that concentric circular recording tracks are formed in the optical recording medium 10 as shown in FIG. 13.

As described hereinabove, two-dimensional information is recorded without reference light in the present invention, though which is necessary in the holographic recording Hence, the optical system is simple and compact advantageously. Furthermore, because multi-level is recorded by means of polarization angle and a plurality of data pages are recorded at a time, the high density recording and high speed transfer can be attained.

[Optical Reading Apparatus]

Figure 17:
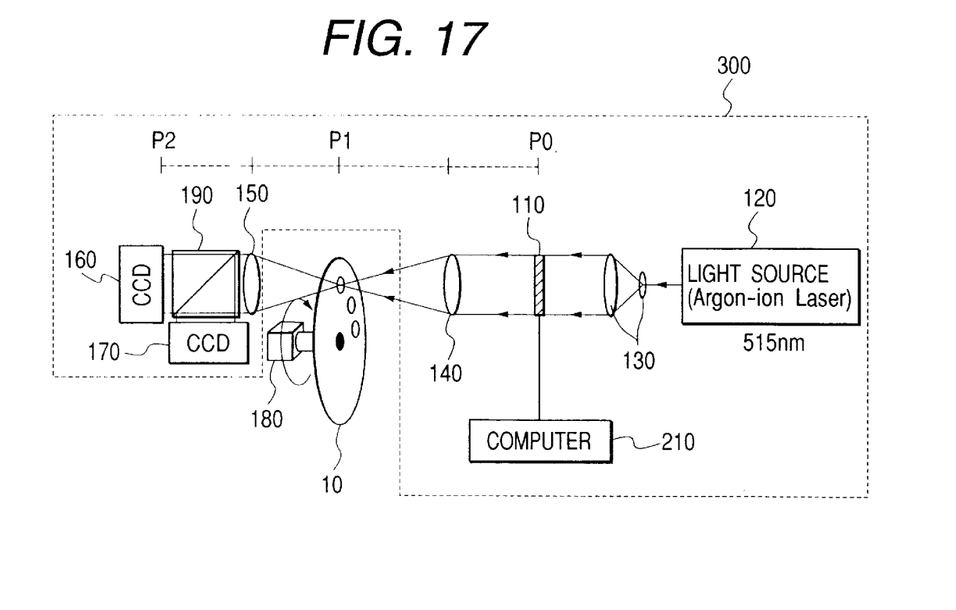
FIG. 17 is a diagram for illustrating an example of an optical reading apparatus in accordance with the present invention.

FIG. 17 is a diagram for illustrating an example of an optical reading apparatus in accordance with the present invention. An optical reading head 300 of the present example comprises the optical recording apparatus shown in FIG. 12, and additionally, a lens 150 for reading, a polarized beam splitter 190, and two-dimensional light detecting elements 160 and 170 such as CCD. The optical recording medium 10 is used for transmission type reproduction shown in FIG. 11A, and the data information is recorded in the form of polarization distribution by the method described hereinabove.

Figure 18:
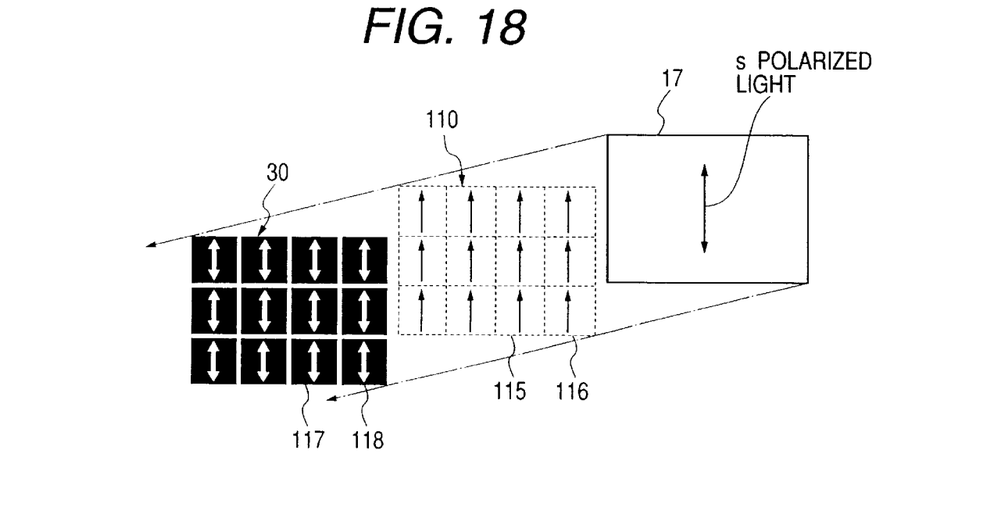
FIG. 18 is a diagram for illustrating a reading light.

The same light source 120 as used for recording is used. A laser emitted from the light source is collimated by use of two lenses 130, and entered to the spatial light modulator 110. The same spatial light modulator 110 as used in recording is used. When the recorded data is read out, the spatial light modulator 110 is controlled by the computer 210 so that all the polarization directions are uniform in an arbitrary direction as shown in FIG. 18. In this example, all the polarization directions are assumed to be s polarization (0 degree).

Now, the pixel 117 which is recorded with the 0 degree polarized light and the pixel 118 which is recorded with the 2ρ polarized light as shown in FIG. 15 are addressed. In reading, the pixels are subjected to Fourier transformation by the lens and the recorded areas are irradiated. The pixel 117 recorded with the polarization angle of 0 degree is read out with the polarization angle of 0 degree, the polarization angle of the transmitted light is not rotated and 0 degree because the orientation of the recorded λ/2 wavelength axis is parallel to the polarization angle of the reading light. On the other hand, the pixel 118 recorded with the polarization angle of 2ρ is read out with the polarization angle of 0 degree, the polarization angle of the transmitted light is rotated 4ρ because the orientation of the recorded λ/2 wavelength axis makes an angle of 2ρ with respect to the polarization angle of the reading light. The transmitted light is subjected to inverse Fourier transformation by the lens 150, and the polarization distribution is imaged on the focal plane P2. As shown in FIG. 4B, the polarization distribution of the reproducing light 40 is converted to the value of double that of the polarization angle of the recording light 20 for each pixel. The multi-level data of each pixel is read out from the polarization distribution.

Figure 19:
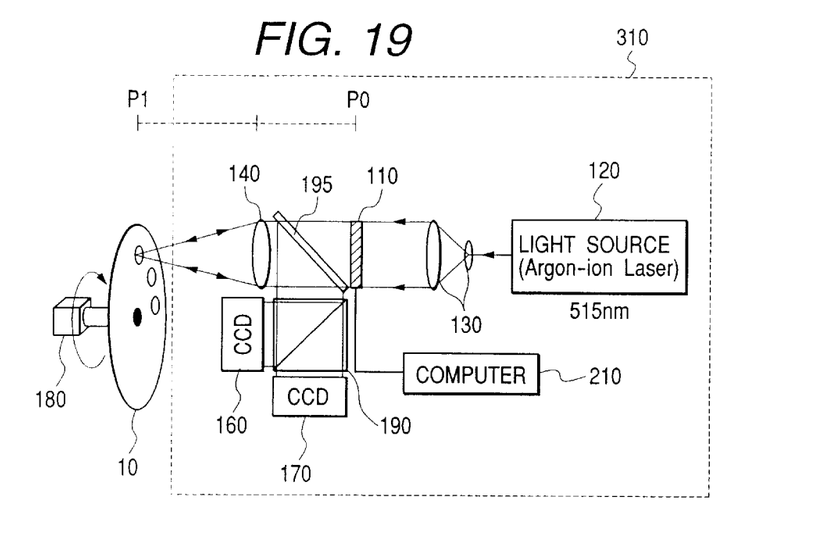
FIG. 19 is a diagram for illustrating another example of an optical reading apparatus in accordance with the present invention.

FIG. 19 is a diagram for illustrating another example of an optical reading apparatus in accordance with the present invention. An optical reading head 310 of the present example comprises the optical recording apparatus shown in FIG. 12, and additionally, a half mirror 195 for reading, a polarizing beam splitter 190, and two-dimensional light receiving elements 160 and 170. The optical recording medium 10 functions to perform reflection type recording/reproduction shown in FIG. 11B, in which the data information is recorded in the form of polarization distribution by means of the method described hereinabove. The same light source 120 as used for recording is used. A laser emitted from the light source is collimated by use of two lenses 130, and entered to the spatial light modulator 110. The same spatial light modulator 110 as used in recording is used.

Figures 20, 21:
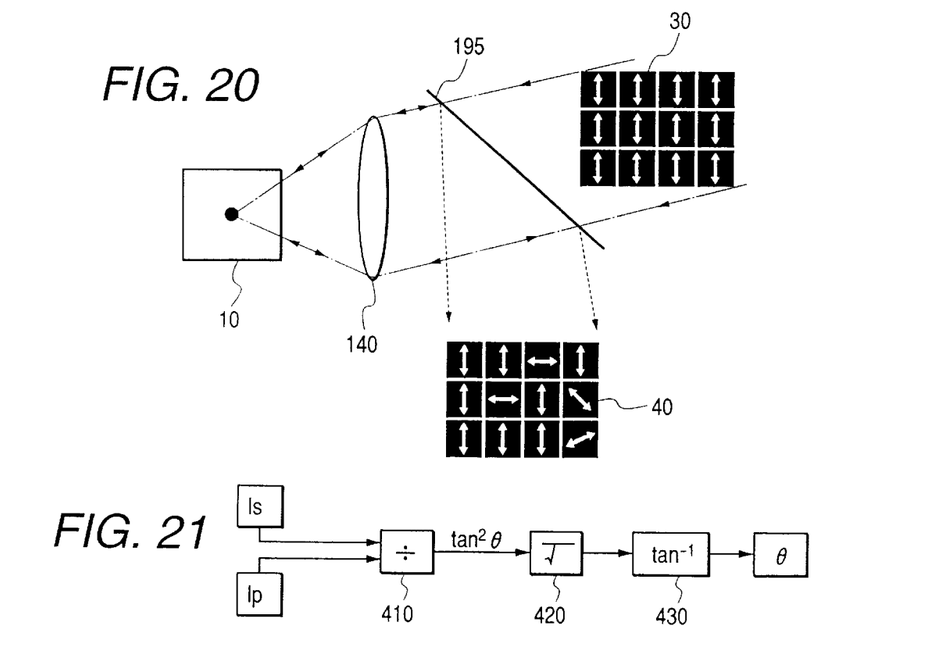
FIG. 20 is a diagram for describing the relation between the reading light and reproducing light.
FIG. 21 is a diagram for illustrating an example of a reading apparatus for reading the polarization angle.

When the recorded data is read out, the spatial light modulator 110; is controlled by the computer 210 so that all the polarization directions are uniform in an arbitrary direction as shown in FIG. 18. The reading light 30 which has passed the spatial light, modulator 110 passes through the half mirror 195, it is subjected to Fourier transformation by use of the lens 140, irradiated onto the optical recording medium 10, and reflected on the reflection layer of the optical recording medium 10 in the reverse direction, and as a result, the reading light 30 passes the optical recording layer twice. Thereby the polarization of the recording light 30 is rotated by means of induced birefringence recorded in each pixel. Then, the reflected light proceeds on the same optical path of the reading light in the reverse direction, the reflected light is subjected to inverse Fourier transformation by use of the lens 140, reflected on the half mirror 195, and imaged on the focal plane of the lens to form a polarization distribution. As shown in FIG. 20, it is obvious that the polarization distribution of the reproducing light 40 is double the polarization angle of the recording light 20 for each pixel. The multi-level data is read for each pixel based on the polarization distribution.

A method for high speed reading of the multi-level data for each pixel based on the polarization angle is described. The data reading unit of the optical reading head shown in FIG. 17 and FIG. 19 is provided with the polarizing beam splitter 190 in the optical path, and the two-dimensional light detecting elements 160 and 170 such as CCD cameras or photo-detector arrays on the focal plane of the reproducing image of the transmitted light and reflected light respectively. In reading, s polarization,component and p polarization component are split from the reproducing light 40 by use of the polarizing beam splitter 190, the s polarization component is detected by the photo-detector array 160, and p polarization component is detected by the photo-detector array 170.

FIG. 21 is a diagram for illustrating one example of a reading apparatus for reading the multi-level polarization angle. As shown in FIG. 21, the output Is of the photo-detector array 160 and the output Ip of the photo-detector array 170 are supplied to a comparative calculation unit comprising a dividing circuit 410, a square root calculation circuit 420, and an arc-tangent calculation circuit 430 for comparative calculation for each corresponding pixel. Assuming that the light intensity of transmitted light (or reflected light) of the optical recording medium of a pixel is I and the polarization angle (s polarization direction is 0 degree) is θ, then the light intensity of s polarization component Is and that of p polarization component Ip are given by the respective equations (6) described hereunder.

[Equation 6]

$$Is = I\cos^2\theta$$
$$Ip = I\sin^2\theta$$
(equation 6)

Accordingly, by dividing Ip by Is by use of the dividing circuit 410, $\tan^2\theta$ is obtained from the dividing circuit 410, $\tan\theta$ is obtained by used of the square root calculation circuit 420, and the polarization angle θ is obtained from the arc-tangent calculation circuit 430. As a result, the information represented based on the difference in polarization) angle of the recording light can be read.

The optical recording medium 10 is rotated by the motor 180, and plural pieces of data pages are reproduced with changing the place in the circumferential direction of the optical recording medium. Furthermore, the optical recording heads 300 and 310 are moved in the radial direction of the optical recording medium 10, and the data is reproduced so that concentric circular recording tracks are formed in the optical recording medium.

As described hereinabove, plural pieces of multi-level data pages in the form of polarization angle are read out at a time by applying the present invention, and high rate transfer is achieved. A memory which has a simple and small-sized optical system and which is operated without adjustment of alignment is obtained.

As described hereinbefore, according to the optical recording method and optical recording apparatus of the present invention, because the multi-level data pages which is arranged two-dimensionally is recorded at a time, the high density and high speed recording is implemented. Because a reference light is not required unlike holographic memory, a compact apparatus is implemented advantageously. In holographic memory, a diffraction light is used for reading the data, the utilization efficiency of the light is low because the diffraction efficiency is not 100%, and the low utilization efficiency results in poor S/N. On the other hand, in the present invention, the light utilization efficiency is nearly 100% because a transmitted light (or reflected light) is used, and S/N is high advantageously.

By applying the optical reading method and optical reading apparatus of the present invention, because plural pieces of multi-level data pages are read out at a time, the high speed reading is implemented. It is possible to form multi-level data pages by means of light intensity in holographic memory, however in the present invention, namely light polarization angle multi-level recording/reading, S/N is high in comparison with the light intensity multi-level recording/reading. Therefore, a low bit error rate can be attained in the case that a memory of the present invention is used as a file memory of a computer.

According to the present invention, the optical recording method, optical recording apparatus, optical reading method, and optical reading apparatus which are capable of high density recording, high speed recording, and high speed reading are obtained.

What is claimed is:

1. An optical recording method in which a recording light comprises a plurality of polarization distributions and said recording light is irradiated onto an optical recording medium to thereby record said recording light comprising the plurality of polarization distribution on said recording medium as a photo-induced birefringence distribution.

2. The optical recording method as claimed in claim 1, wherein said recording light which has been subjected to Fourier transformation is irradiated onto said optical recording medium.

3. The optical recording method as claimed in claim 1, wherein said recording light has a two-dimensional polarization distribution formed correspondingly to a data information.

4. The optical recording method as claimed in claim 1, wherein said optical recording medium contains at least one layer of optical recording material which exhibits photo-induced birefringence.

5. The optical recording method as claimed in claim 4, wherein a thickness d of said optical recording material satisfies the relation $\Delta n \cdot d = (m+\frac{1}{2}) \cdot \lambda$, where m denotes an integer of 1 or larger, λ denotes a wavelength of the reading light, and Δn denotes birefringence change induced by the recording light.

6. The optical recording method as claimed in claim 4, wherein a thickness d of said optical recording material satisfies the relation $\Delta n \cdot d = (m+\frac{1}{4}) \cdot \lambda$, where m denotes an integer of 1 or larger, λ denotes a wavelength of the reading light, and Δn denotes birefringence change induced by the recording light.

7. The optical recording method as claimed in claim 4, wherein said optical recording material is a polymer or polymeric liquid crystal having an isomerizable side chain.

8. The optical recording method as claimed in claim 7, wherein said isomerizable group contains an azobenzene structure.

9. The optical recording method as claimed in claim 7, wherein said polymer or polymeric liquid crystal is at least polymerized products selected from a group of polyesters.

10. The optical recording method as claimed in claim 4, wherein said optical recording material is a polymer in which photoisomerizable molecules are dispersed.

11. The optical recording method as claimed in claim 10, wherein said photoisomerizable molecule contains an azobenzene structure.

12. An optical recording apparatus provided with a light source for emitting a coherent light, a spatial light modulator for polarization modulating the light from said light source correspondingly to a data information to obtain a recording light, and an imaging or focusing optical system for irradiating said recording light onto an optical recording medium.

13. The optical recording apparatus as claimed in claim 12, wherein said focusing optical system is structured so that said recording light is subjected to Fourier transformation.

14. The optical recording apparatus as claimed in claim 12, wherein said spatial light modulator is structured with a opto-electric conversion material having transparent electrodes on both sides thereof.

15. The optical recording apparatus as claimed in claim 14, wherein said opto-electric conversion material is liquid crystal.

16. An optical recording apparatus provided with an optical recording head having a light source for emitting a coherent light, a spatial light modulator for polarization modulating the light from said light source correspondingly to a data information to obtain a recording light, and a focusing optical system for irradiating said recording light onto an optical recording medium, a head moving mechanism for moving said optical recording head in a radial direction of said optical recording medium, and a medium driving mechanism for driving said optical recording medium.

17. The optical recording apparatus as claimed in claim 16, wherein said optical recording medium is a built-in optical recording medium.

18. The optical recording apparatus as claimed in claim 16, wherein said optical recording medium records said recording light as a photo-induced birefringence.

19. The optical recording apparatus as claimed in claim 16, wherein said optical recording medium records a Fourier transformed image of said recording light as a photo-induced birefringence.

20. The optical recording apparatus as claimed in claim 16, wherein said optical recording medium is a disc-shaped optical recording medium.

21. An optical reading method in which a reading light having a uniform polarization distribution is generated, said reading light is irradiated onto an optical recording medium having a photo-induced birefringence, and a polarization distribution of a transmitted light or reflected light from said optical recording medium is read as a polarization distribution of a reproducing light.

22. The optical reading method as claimed in claim 21, wherein said reading light which has been subjected to Fourier transformation is irradiated onto said optical recording medium.

23. The optical reading method as claimed in claim 22, wherein said transmitted light or reflected light is subjected to inverse Fourier transformation.

24. The optical reading method as claimed in claim 21, wherein the polarized light of said reading light is a linearly polarized light having a certain arbitrary direction.

25. The optical reading method as claimed in claim 21, wherein said transmitted light or reflected light is split into two orthogonal polarization components, light intensities of both of said polarization components are compared with each other and calculated, and said comparison and calculation result is read.

26. An optical reading method in which a reading light is irradiated onto an optical recording medium where a recording light having a plurality of polarization distributions formed correspondingly to a data information is recorded in a form of photo-induced birefringence, a transmitted light or reflected light from said optical recording medium is split into two orthogonal polarization components, light intensities of said respective two polarization components are compared and calculated, and said data information is read based on said comparison and calculation result.

27. An optical reading apparatus provided with a reading optical system for irradiating a reading light onto an optical recording medium where a recording light having a data information in a form of spatial polarization distribution is recorded in a form of photo-induced birefringence, and a photo-detector for detecting a polarization distribution of a transmitted light from said optical recording medium.

28. The optical reading apparatus as claimed in claim 27, wherein said reading optical system has a spatial light modulator for forming a linearly polarized reading light having an arbitrary direction.

29. The optical reading apparatus as claimed in claim 28, wherein said spatial light modulator is structured with a opto-electric conversion material having transparent electrodes on both sides thereof.

30. The optical reading apparatus as claimed in claim 29, wherein said opto-electric conversion material is liquid crystal.

31. The optical reading apparatus as claimed in claim 27, wherein said reading optical system is structured so that said reading light is subjected to Fourier transformation.

32. The optical reading apparatus as claimed in claim 31, wherein said transmitted light which has been subjected to inverse Fourier transformation is incident upon said photo-detector.

33. The optical reading apparatus as claimed in claim 27, wherein said photo-detector is a photo-detector for detecting the polarization distribution of the transmitted light through a polarizing beam splitter and comprises two photo-detectors for separately detecting two orthogonal polarization components split by said polarizing beam splitter.

34. The optical reading apparatus as claimed in claim 33, wherein a comparison calculation unit for comparing and calculating detected outputs of said respective two photo-detectors is provided.

35. An optical reading apparatus provided with a reading optical system for irradiating a reading light onto an optical recording medium where a recording light having a data information in a form of spatial polarization distribution is recorded in a form of photo-induced birefringence, an optical element for receiving a reflected light from said optical recording medium, and a photo-detector for detecting a polarization distribution of the reflected light from said optical element.

36. An optical reading apparatus provided with an optical reading head having a reading optical system for irradiating a reading light onto an optical recording medium where a recording light is recorded in a form of photo-induced birefringence, a photo-detector for detecting a polarization distribution of a transmitted light or reflected light from said optical recording medium, a head moving mechanism for moving said optical reading head in a radial direction of said optical recording medium, and a medium driving mechanism for driving said optical recording medium.

37. The optical reading apparatus as claimed in claim 36, wherein said optical recording medium is a built-in optical recording medium.

* * * * *